(12) United States Patent
He et al.

(10) Patent No.: US 9,245,399 B2
(45) Date of Patent: Jan. 26, 2016

(54) MEDIA AUTHENTICATION

(71) Applicant: NCR CORPORATION, Duluth, GA (US)

(72) Inventors: Chao He, Happy Valley (HK); Gary Ross, Edinburgh (GB)

(73) Assignee: NCR Corporation, Duluth, GA (US)

( * ) Notice: Subject to any disclaimer, the term of this patent is extended or adjusted under 35 U.S.C. 154(b) by 215 days.

(21) Appl. No.: 13/919,064

(22) Filed: Jun. 17, 2013

(65) Prior Publication Data

US 2014/0369590 A1 Dec. 18, 2014

(51) Int. Cl.
G07D 7/00 (2006.01)
G07D 7/04 (2006.01)
G07D 7/12 (2006.01)
G06K 9/18 (2006.01)
G07D 7/16 (2006.01)

(52) U.S. Cl.
CPC *G07D 7/04* (2013.01); *G06K 9/186* (2013.01); *G07D 7/12* (2013.01); *G07D 7/162* (2013.01); *G07D 7/00* (2013.01)

(58) Field of Classification Search
CPC ........... G07D 7/00; G07D 7/04; G07D 7/004; G06K 9/186
See application file for complete search history.

(56) References Cited

U.S. PATENT DOCUMENTS

| | | | | |
|---|---|---|---|---|
| 5,014,325 | A * | 5/1991 | Moritomo | 382/135 |
| 5,545,885 | A * | 8/1996 | Jagielinski | 235/449 |
| 5,761,089 | A * | 6/1998 | McInerny | 702/128 |
| 6,474,548 | B1 * | 11/2002 | Montross et al. | 235/379 |
| 2009/0008451 | A1 * | 1/2009 | Ozawa | 235/449 |
| 2009/0152356 | A1 * | 6/2009 | Reddy et al. | 235/449 |
| 2013/0329983 | A1 * | 12/2013 | Kinoshita | 382/139 |
| 2014/0367469 | A1 * | 12/2014 | Schutzmann | 235/450 |

* cited by examiner

*Primary Examiner* — Utpal Shah
(74) *Attorney, Agent, or Firm* — Schwegman, Lundberg, Woessner

(57) ABSTRACT

A method of authenticating a media item is described. The method comprises: measuring a magnetic signal along the media item, converting the measured signal to a calibrated length signal, aligning the calibrated length signal with a reference signal, extracting features from the aligned signal, and classifying the media item based on the extracted features.

16 Claims, 7 Drawing Sheets

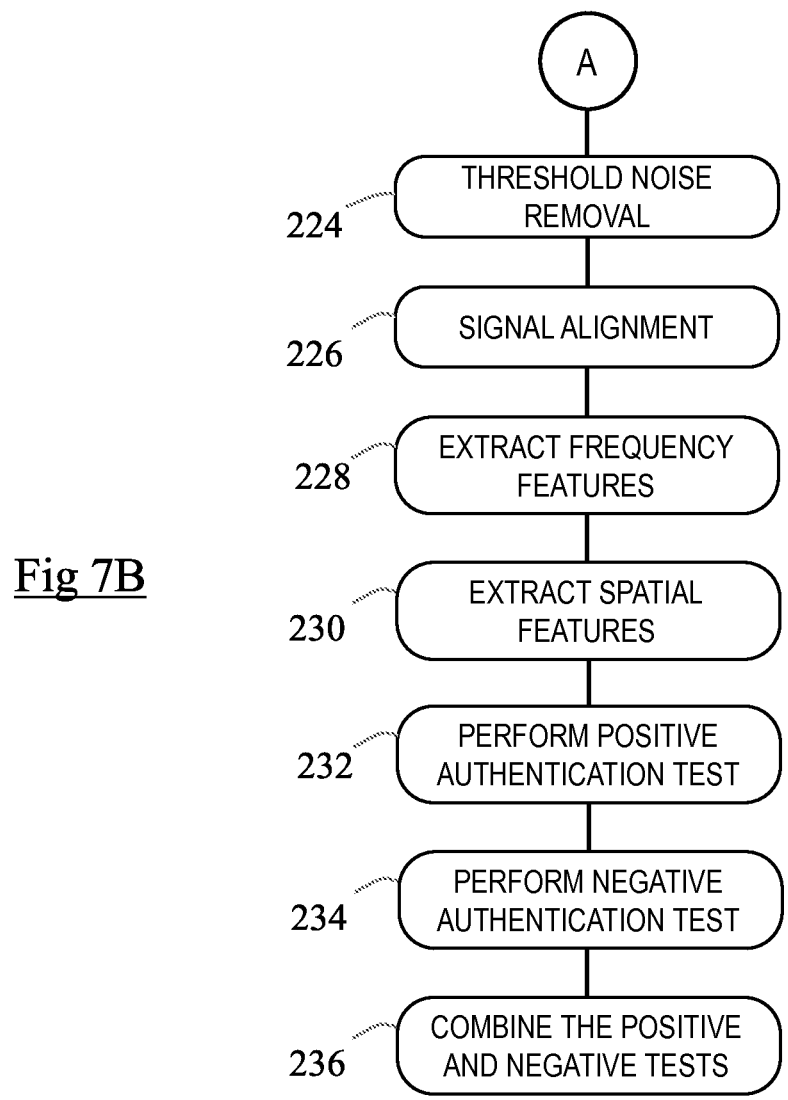

MEDIA AUTHENTICATION

FIELD OF INVENTION

The present invention relates to media authentication, such as automated banknote authentication.

BACKGROUND OF INVENTION

To make it more difficult to create high quality counterfeit banknotes, genuine banknotes include a variety of security features. Some of these security features can be detected using imaging sensors, such as a fluorescent security feature (which responds to an ultra-violet light source), an infra-red security feature (which produces a characteristic response to an infra-red light source), and the like. However, some types of security feature cannot be detected using an imaging sensor. One such security feature is magnetic ink, which is used to print some parts of a banknote.

It would be desirable to be able to detect a counterfeit banknote (or other counterfeit media item) using magnetic sensors either instead of, or in addition to, using imaging sensors.

SUMMARY OF INVENTION

Accordingly, the invention generally provides methods, systems, apparatus, and software for authenticating a media item by comparing features extracted from a processed magnetic signal to features extracted from a reference template created only from genuine media items.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of authenticating a media item, the method comprising: measuring a magnetic signal along the media item, converting the measured signal to a calibrated length signal, aligning the calibrated length signal with a reference signal, extracting features from the aligned signal, and classifying the media item based on the extracted features.

The step of measuring a magnetic signal along the media item may comprise measuring a plurality of magnetic signals along the media item. The plurality of magnetic signals may be provided by a plurality of magnetic read heads extending over the width (for example, where the media item is transported short edge first) or length (for example, where the media item is transported short edge first) of the media item as it is transported passed the magnetic read heads. The output of each magnetic read head may be referred to as a channel.

Each channel may provide a continuous output signal that is sampled to produce individual data points. A suitable sampling rate may be several thousands of readings per second (for example, 5800 readings per second). The media item may be transported at several hundreds of millimeters per second, for example, approximately 700 mm per second.

The method may include the additional step, after measuring the signal, of removing system noise from the measured signal. The step of removing system noise from the measured signal may be implemented by performing Fourier analysis to ascertain the desired frequency range, applying a Fast Fourier Transform (FFT), setting the discrete FFT coefficients to zero outside the desired frequency range, and then applying an Inverse Fast Fourier Transform to remove the frequencies corresponding to system noise.

The method may include the additional step, for example, after measuring the signal or after removing system noise from the measured signal, of averaging every $\theta$ sampled points (from each channel) to create one averaged sample point. This reduces the number of points to be processed by $\theta$, where $\theta$ is a value chosen to give the desired reduction. There may not be much advantage in implementing this step in a very high speed processing system, although it may still be performed to average out noise from the measured signals.

The length of the measured signal from one media item may differ from the length of the measured signal from another example of the same media type. For example, two banknotes of the same currency, denomination, and series may have slightly different magnetic signal lengths. It is even possible that different channels measuring the same media item may produce a different signal length. This is why the method may include the step of converting the measured signal to a calibrated length signal.

Converting the measured signal to a calibrated length signal may comprise ascertaining a center point of the measured signal length and cropping the measured signal length to half of the desired length in opposite directions from the center point.

Alternatively, converting the measured signal to a calibrated length signal may comprise ascertaining leading edge coordinates of the media item from other sensors (for example, an imaging sensor), and cropping the measured signal length using the desired length and the actual media item starting point.

The desired length may be slightly shorter than the standard media item length (for example, by a constant value c) to accommodate shrinkage of the media item.

The method may include the further step (preferably after the step of converting the measured signal to a calibrated length signal) of normalizing the magnetic signal. The step of normalizing the magnetic signal may comprise the steps of calculating the mean value of the magnetic signal and subtracting the mean value of the magnetic signal from the magnetic signal. This may be applied to the calibrated length signal, the averaged signal, or the measured signal. By subtracting the mean value of the signal from the signal, a calibrated amplitude signal is provided.

Alternatively, normalizing the magnetic signal may be implemented by any other convenient technique such as dividing the signal by its maximum value, or using a standard whitening process.

The step of aligning the calibrated length signal with a reference signal may comprise the steps of: (i) retrieving a reference signal corresponding to the calibrated length signal from a template (for example, from a corresponding channel in the template), and (ii) minimizing the root mean square (RMS) errors between the calibrated length signal and the reference signal.

The reference signal may be any signal selected from a training set (for example, for a corresponding channel), or the average (or some other combination) of all signals of the training set (for the corresponding channel).

Minimizing the RMS errors may be implemented by shifting the calibrated length signal along the sampling position axis. For each shift (that is, for each shift by one sampling position), the RMS value between the shifted signal and the reference signal is calculated. After evaluating all possible shifts within a defined range (for example, from minus ten sampling positions to plus ten sampling positions), the shift with the minimal RMS value is selected; and the corresponding shifted signal is regarded as the aligned signal.

A different technique than minimizing the RMS errors may be used, such as mean square error (MSE) technique, Euclidean distance technique, cosine distance technique, or any other convenient similarity, error or distance metric technique.

Aligning the calibrated length signal with a reference reduces the effects of vibration and friction in the transport system (the system that transports the media item), and also reduces the effects of rotation, skew, shrinkage, and the like of the media item.

The aligned signals may still consist of some small noise, particularly in the sections where there is no magnetic feature, so further noise reduction and filtering may be required. A threshold $\xi$ may be introduced so that any value within the range of $[-\xi, \xi]$ will be set to 0. The value of $\xi$ can be determined adaptively according to a small percentage of the maximum amplitude M of the reference signal of a training set, that is $\xi=\beta \cdot M$, where $\beta$ is a small positive value and normally less than 0.20, for example $\beta$ can be set to 0.15.

The step of extracting features from the aligned signal may comprise the steps of (i) extracting features from the spatial domain, and/or (ii) extracting features from the frequency domain.

The optional step of extracting features from the spatial domain may be implemented using any convenient model that is capable of inferring a degree of match between two one-dimensional signals in the spatial domain. One type of model is a Pearson Product-Moment Correlation Coefficient (PPMCC) model, described, for example, in J. L. Rodgers and W. A. Nicewander, Thirteen ways to look at the correlation coefficient, The American Statistician, 42(1): 59-66, February 1988. Other convenient models include (i) the Intersection Score adapted from the color histogram intersection matching in M. J. Swain and D. H. Ballard, Color Indexing, International Journal of Computer Vision, 7(1): 11-32, 1991; (ii) the Hamming distance described in R. W. Hamming, Error detecting and error correcting codes, Bell System Technical Journal 29 (2): 147-160, 1950; and (iii) City-Block, Canberra, and the other distances summarized and/or implemented in GEDAS: http://gedas.bizhat.com/

Optionally, once the selected spatial domain model is applied (for example, PPMCC), features are extracted that indicate the degree of match between the aligned signal and the corresponding reference. The corresponding reference may comprise a composite signal, or a plurality of signals, from a training set. The corresponding reference relates to the same channel as the aligned signal. There may be one spatial feature for each channel in the reference. The type of spatial features (that is, the spatial domain model) is also specified by the template.

The optional step of extracting features from the frequency domain may be implemented using a Discrete Fourier Transform (DFT), which transforms a signal from the time domain into the frequency domain, producing coefficients corresponding to different frequency components. The DFT can be implemented using the Fast Fourier Transform (FFT) algorithm.

The optional step of extracting features from the frequency domain may further include removing high frequency components (since these usually only relate to noise) and using the predefined first n (where n is a whole number) frequency components for feature extraction.

Since the frequency is additive, the frequency features can be extracted from the sum of signals from all selected channels. For extracting the frequency features, pre-processing of the magnetic signal (length calibration, alignment, and the like) is not necessary.

The step of classifying the media item based on the extracted features may comprise a positive test and/or a negative test.

The positive test may comprise validating that the aligned signal from the media item has an expected magnetic response at the spatial locations corresponding to the magnetic ink printed areas of a genuine media item (the reference).

The negative test may comprise validating that the aligned signal from the media item has no magnetic response at the spatial locations that are not magnetic-ink-printed in a genuine media item (the reference).

The positive test may comprise (i) implementing a threshold test for spatial features extracted from the aligned signal and/or (ii) implementing a $D^2$ test for frequency features extracted from the aligned signal.

The threshold test may be implemented by calculating the average of the spatial feature values (there would be one spatial feature value for each channel, and these would be averaged to produce a single average feature value) and comparing the average feature value to a threshold derived from a training set. The media item would pass the test if its average feature value is greater than or equal to the threshold, otherwise it would fail the test.

Alternatively, the threshold test may be implemented by comparing the spatial feature value of each selected channel to the corresponding threshold for that channel (derived from the training set). The results for each of the individual channels can then be combined together to provide the final decision. Any decision combination technique may be used. One example is to use majority voting, where the media item passes the test if the majority of the channels have a feature value greater than or equal to the threshold; otherwise it would fail the test.

Where a $D^2$ test is implemented, the extracted frequency features are used. A $D^2$ test is described in U.S. Pat. No. 7,639,858 assigned to NCR Corporation. The media item will either pass or fail this test.

The negative test may comprise (i) ascertaining start and end coordinates of each area of the media item that should not have a magnetic response (each a magnetic-free zone) by accessing data stored in a reference, (ii) calculating, for each magnetic-free zone, a ratio of non-zero points to all points along the length of the magnetic-free zone (for example, if there are 100 points and 45 of these points are non-zero points, then the ratio is 0.45), and (iii) calculating an overall average of the ratios for all magnetic-free zones (in all channels, if multiple channels are used) (the overall false ratio). If the overall false ratio is less than or equal to a threshold specified by a reference, the media item passes the test; otherwise the media item fails the test.

The step of classifying the media item based on the extracted features may further comprise combining the results of the positive test and the negative test.

The results may be combined by using a unanimous vote so that a media item is only passed as genuine if the media item passes both the positive test and the negative test.

Alternatively, the results may be combined by using weighting factors to reflect the characteristics of individual media items. For example, the combined results may be based on a normalized positive result score multiplied by a weighting factor ($\alpha$) plus a normalized negative result score multiplied by one minus $\alpha$ (where $\alpha$ is between zero and one). For media items that do not have many (or any) designated magnetic features, the weighting factor ($\alpha$) may be low such that a positive test is not given much significance.

The step of classifying the media item based on the extracted features may include the sub-step of classifying the media item based on a combination of image-based processing and the extracted features relating to the magnetic response.

The image based processing may use a technique similar to that described in U.S. Pat. No. 7,639,858, which is incorporated herein by reference.

According to a second aspect there is provided a computer program comprising program instructions for implementing the method of the first aspect. The computer program may be executed by a processor in a media validator.

The computer program may also implement one or more of the consistory clauses described in relation to the first aspect.

According to a third aspect there is provided a self-service terminal comprising a magnetic reader for measuring magnetic signals from a media item, and a controller operable to: (i) convert the measured signal to a calibrated length signal, (ii) align the calibrated length signal with a reference, (iii) extract features from the aligned signal, and (iv) classify the media item based on the extracted features.

The controller may be further operable to transport the media item.

According to a fourth aspect there is provided a media validator comprising: a media item transport for transporting a media item; a magnetic reader aligned with the media item transport and operable to measure magnetic signals from the media item as the media item moves relative to the magnetic reader; and a processor programmed to control the media transport and the magnetic reader, and also programmed to: (a) convert the measured signal to a calibrated length signal, (b) align the calibrated length signal with a reference, (c) extract features from the aligned signal, and (d) classify the media item based on the extracted features.

The media validator processor may further implement the additional steps recited with respect to the first aspect.

The media validator preferably implements additional media item processing functions, such as media item recognition, stain detection, wear detection, extraneous matter detection, and the like.

The media item may comprise a banknote, a ticket, a coupon, or the like.

According to a fifth aspect there is provided a method of creating a template for use in media validation, the method comprising: receiving magnetic signals retrieved from a plurality of channels, each channel including magnetic information from part of a media item; collating magnetic signals for a plurality of media items; creating a reference signal for each channel by combining signals from different media items for the same channel; deriving at least one feature for each channel; calculating a positive test parameter; calculating a negative test parameter; and creating a template including the reference signals, the derived features, the positive test parameter, and the negative test parameter.

The method may include the further step of identifying channels that include no meaningful magnetic information, and discarding those channels so that only valid channels are stored in the template.

The method may include the further step of aligning signals from each valid channel with the reference signal for that channel.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
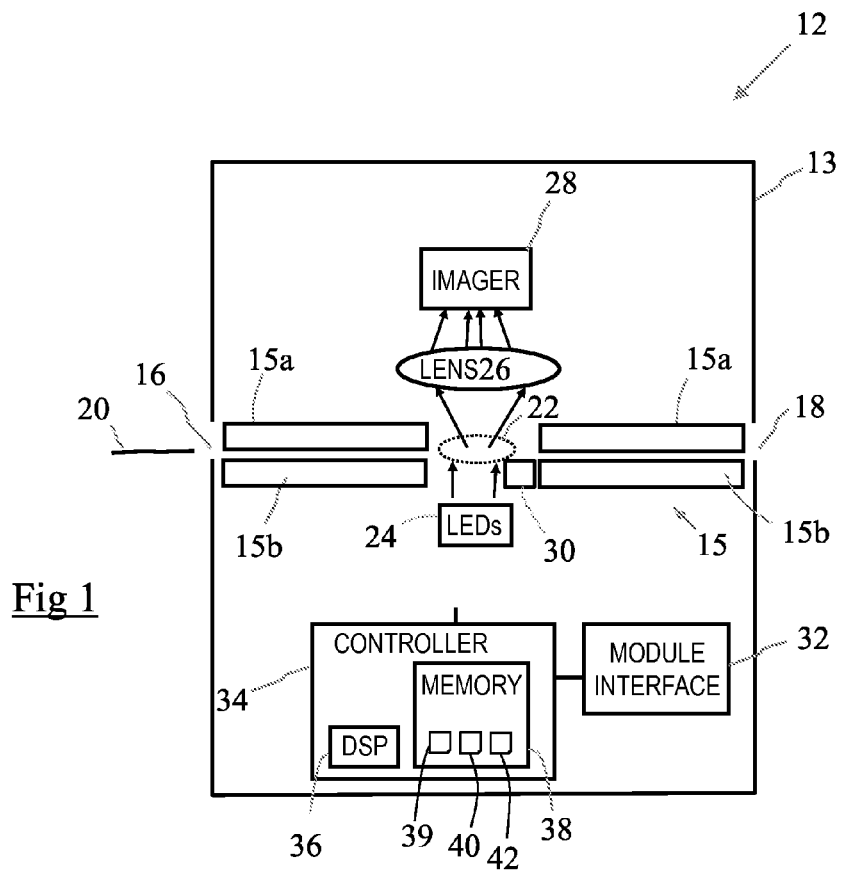
FIG. 1 is a schematic diagram of a media validator for implementing a method of authenticating media inserted therein according to one embodiment of the present invention.

Reference is first made to FIG. 1, which is a simplified schematic diagram of a media validator 12 (in the form of a banknote validator) for implementing a method of authenticating media inserted therein according to one embodiment of the present invention.

The banknote validator 12 comprises a housing 13 supporting a transport mechanism 15 in the form a train of pinch rollers comprising upper pinch rollers 15a aligned with lower pinch rollers 15b, extending from an entrance port 16 to a capture port 18.

The entrance and capture ports 16,18 are in the form of apertures defined by the housing 13. In use, the capture port 18 would typically be aligned with parts of a depository or recycler module.

In use, the pinch rollers 15a,b guide a media item (in this embodiment a banknote) 20 short edge first through an examination area 22 defined by a gap between adjacent pinch roller pairs. While the banknote 20 is being conveyed through the examination area 22, the banknote 20 is illuminated selectively by illumination sources 24 (not illustrated in detail). The illumination sources 24 are provided for banknote validation and other functions of the banknote validator 12 (for example, banknote identification, counterfeit detection, stain detection, and the like), as is known to those of skill in the art. An optical lens 26 focuses light transmitted through the banknote 20 to an optical imager 28 (in this embodiment a CIS sensor).

A magnetic sensor array 30 is provided at the examination area 22. This array 30 comprises six magnetic read heads (not shown individually) disposed in a linear array extending across a path over which the banknote 20 is transported. As such, when the banknote 20 passes over the magnetic sensor array 30, the six read heads extend over the width (which is the dimension parallel to the short edge) of the banknote 20.

The banknote validator 12 includes a data and power interface 32 for allowing the banknote validator 12 to transfer data to an external unit, such as an ATM (not shown) a media depository or recycler (not shown), or a PC (not shown), and to receive data, commands, and power therefrom. The banknote validator 12 would typically be incorporated into a media depository or recycler module, which would typically be incorporated into an ATM.

The banknote validator 12 also has a controller 34 including a digital signal processor (DSP) 36 and an associated memory 38. The controller 34 controls the transport mechanism 15, the illuminating source 24, the CIS sensor 28, and the magnetic sensor array 30.

The controller 34 also collates and processes data captured by the image sensor 28, and the magnetic sensor array 30, and communicates this data and/or results of any analysis of this data to the external unit via the data and power interface 32.

In this embodiment, the media validator 12 transports banknotes at approximately 700 mm per second. Each magnetic read head in the magnetic sensor array 30 measures approximately 5800 readings per second. Thus, each magnetic read head produces a signal having over a thousand data points for a typical banknote. Each magnetic read head is referred to herein as a channel, so that this embodiment has six channels.

Figure 2:
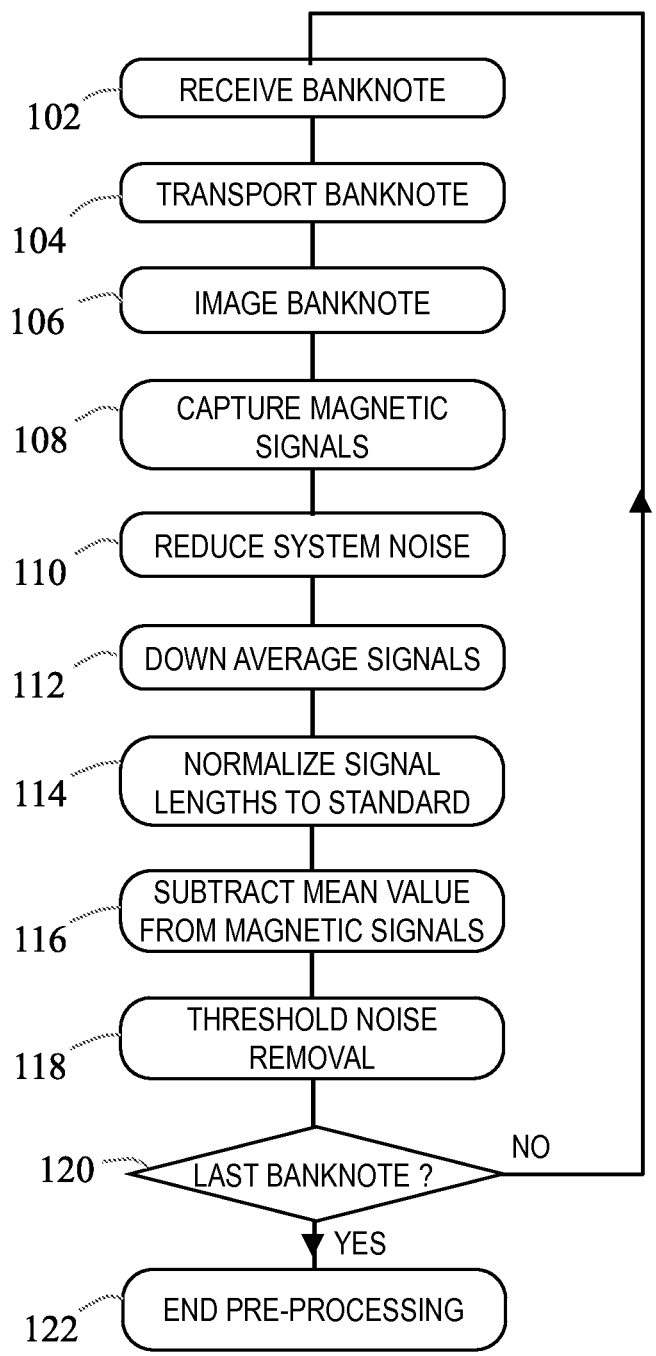
FIG. 2 is a flowchart illustrating pre-processing steps performed by the media validator of FIG. 1 in creating a training set for use in generating a template for the media validator of FIG. 1.

Reference is now also made to FIG. 2, which is a flowchart 100 illustrating pre-processing steps performed by the banknote validator 12 (as controlled by the DSP 36) to create a banknote authentication template for a specific denomination and orientation of banknote. The specific denomination relates to a denomination and series (for example, a series two United States twenty dollar bill). The orientation relates to one of four possible orientations: front forward, front back, rear forward, and rear back. Thus, for each specific denomination, four templates are required (one for each orientation). Only four orientations are required because banknote validators are typically designed to receive a banknote either long edge first or short edge first, but not both. The combination of a banknote denomination, series, and orientation is referred to herein as a "banknote type".

A template is created by analyzing a relatively large number of genuine banknotes (for example one hundred banknotes) of the same denomination and series. This large number of banknotes is referred to as the training set. Using a relatively large training set enables the template to take account of variations between authentic banknotes that are ostensibly identical. Four templates will be created from each training set; one template for each orientation. To create a template for one orientation, each banknote in that training set is inserted in that orientation.

Initially, a banknote 20 from the training set is inserted into the validator 12, which the banknote validator 12 receives (step 102). The banknote 20 is inserted in the orientation for which a template is being created.

The controller 34 then transports the banknote 20 to the examination area 22 (step 104) and causes the CIS sensor 28 to capture an image of the banknote 20 (step 106) and the magnetic sensor array 30 to capture analogue signals (one from each magnetic read head) from the banknote 20 (step 108).

The controller 34 operates on and processes the image created by the CIS sensor 28, but how this is performed is not relevant to this embodiment so will not be described in detail herein.

The controller 34 operates on the analogue signals from the magnetic sensor array 30 to reduce noise introduced by the media validator 12 (step 110).

In this embodiment, the method used to reduce system noise uses Fourier spectral analysis to identify the valid frequency range.

The valid frequency range can be identified as follows. A Fast Fourier Transform (FFT) operation can be used to conduct signal spectral analysis. FFT is first performed on signals that may contain noises. Then the power spectral density is computed using the complex conjugate of the discrete Fourier transform output. This provides a measurement of the energy at various frequencies. Finally the frequency range that corresponds to the strong power spectral densities is selected. The higher a power peak is, the stronger the corresponding frequency that is contained in the signal.

FFT and subsequent inverse FFT operations are then used to remove the frequency components outside the valid frequency range [Fs_start, Fs_end]. To improve efficiency, the FFT function and the Inverse FFT (IFFT) function are implemented using a fixed length of the next power of two up from the signal length (for example, if the signal length is 783 points, the next power of two up is 1024). The FFT and IFFT functions are implemented as follows (sub-steps (i) to (iv)).

(i) For each signal carry out the Fast Fourier Transform $$Y = FFT(x),$$

where x is the raw signal in time domain; and Y is the discrete FFT coefficients in the frequency domain.

(ii) Calculate the indices (I) (starting from 1) of the FFT components corresponding to the valid frequency range [Fs_start, Fs_end].

$$I_1 = \text{floor}\left(\frac{FS\_start}{fs/n} + 1\right)$$

$$I_2 = \text{floor}\left(\frac{FS\_end}{fs/n} + 1\right)$$

Where, n is the signal length and transform length, and fs is the sensor sampling frequency.

Since the second half of Y is just a reflection of its first half, the mirrored indices of $I_1$ and $I_2$ are also calculated, as follows:

$$I_3 = n - I_1 + 1$$

$$I_4 = n - I_2 + 1$$

(iii) Set the FFT coefficients Y to zero except for the indices ($[I_1, I_2]$ and $[I_4, I_3]$) that are corresponding to the valid frequency range.

(iv) Carry out the IFFT on the modified FFT coefficients $Y_1$ to obtain the filtered signal in the time domain.

$$x\_filtered = real(IFFT(Y_1))$$

Where, the function real(•) returns the real part of the elements of the complex array.

Returning to the training set creation flowchart 100 of FIG. 2, the next step is to down average the filtered signals (step 112).

In this embodiment, a raw magnetic signal from a read head in the magnetic sensor array 30 typically has more than 1000 sample points when a banknote is measured. Down averaging is used to reduce this number of sample points (that is, to reduce the signal length). This has the advantage of averaging out noise from the signal. It also has the advantage of reducing the computational cost. Down averaging is implemented in this embodiment by averaging every θ sample points from a channel (or read head), where θ can be selected based on the sampling rate. In this embodiment, θ was selected as "11". This is performed for all six read heads in the magnetic sensor array 30.

Returning to the training set creation flowchart 100 of FIG. 2, the next step is to normalize the signal length from all of the read heads in the magnetic sensor array 30 so that each of the signal lengths matches the length Ln of a standard banknote of that denomination and series (step 114). This is performed because the length of a magnetic signal varies between banknotes, and may even vary between read heads in the magnetic sensor array 30 for the same banknote.

Normalizing the length of the magnetic signals may be implemented by using data captured by the CIS sensor 28. In particular, an image from the CIS sensor 28 may be processed to identify the actual starting and actual ending points of the banknote. These actual starting and ending points may be used to crop the signal lengths to the standard length Ln.

Alternatively, if an image from the CIS sensor 28 is not available, or if it is preferred not to use such an image, then the standard length Ln may be calculated using the sensor sampling frequency fs (Hz), banknote transport speed Dv (mm/s), and the theoretical note length L (mm) for a given currency denomination. In particular, the minimal theoretical sample size Ns for the banknote can be obtained using the equation:

$$Ns = \frac{fs(L-\varepsilon)}{Dv},$$

where $\varepsilon$ is a small artificial tolerance introduced to reflect the fact that many circulated banknotes are slightly shorter than the theoretical note length. In this example, the value of $\varepsilon$ is selected as 1.

After finding the mid-point of a magnetic signal (that is, the middle sample point), the magnetic signal can be cropped to the new length (in data points) Ns by removing those data points that extend beyond half of the data points in each direction from the mid-point (that is, removing the head and tail of the magnetic signal).

In this embodiment, normalizing the signal lengths occurs after the down average step, so an additional sub-step, as described below, is needed to obtain the new signal length.

$$Ns = floor(Ns/\theta)$$

Where, θ is the same parameter used in the down average step; and the function floor(•) rounds its input value down to the next smallest integer.

Returning to the training set creation flowchart 100 of FIG. 2, the next step is to subtract the mean value for each magnetic signal from each magnetic signal (step 116). Typically, the mean values of magnetic signals from genuine and counterfeit banknotes are at similar level in the banknote validator 12; therefore, it is beneficial to subtract the mean value of each signal from that signal. As magnetic signal amplitude plays an important role in differentiating between genuine and counterfeit notes, the mean subtraction was chosen over a full standardization. The latter means that in addition to subtracting the mean value of each signal from that signal, the signal amplitudes are divided by the standard deviation for that signal so that the standardized signal will have a mean of zero and a standard deviation of one.

Figure 3A:
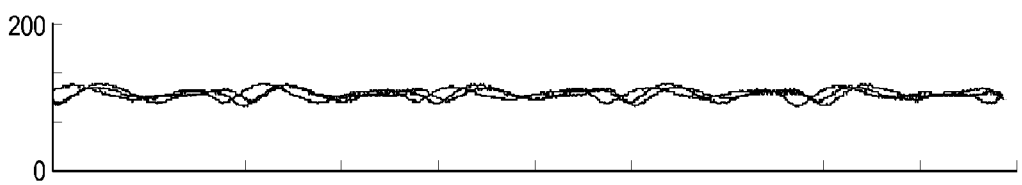
FIG. 3a is a graph illustrating raw magnetic signals recorded by part of the media validator (a magnetic read head) from a media item (white paper)
Figure 3B:
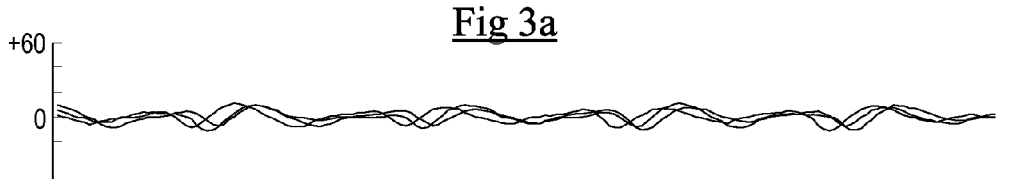
FIG. 3b is a graph illustrating the down averaged raw magnetic signals shown in FIG. 3a, but without filtering for system noise.
Figure 3C:
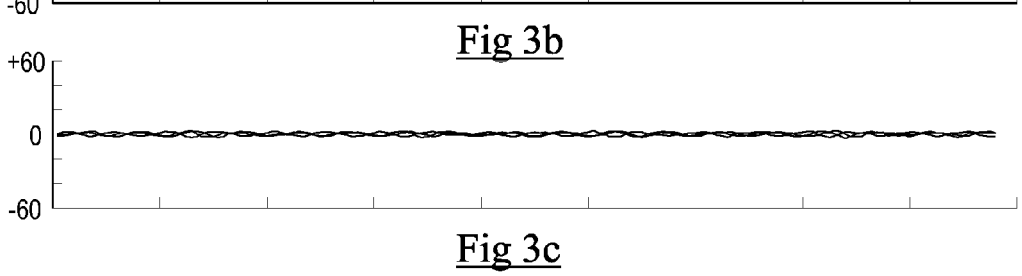
FIG. 3c is a graph illustrating the down averaged raw magnetic signals shown in FIG. 3b, but with the system noise filtering as performed by the media validator.

Reference will now also be made to FIGS. 3a to 3c to illustrate the effect of this system noise filtering step (that is, step 110), the down averaging step (step 112), and the mean value subtraction step (step 116).

FIG. 3a is a graph illustrating raw magnetic signals recorded by one magnetic read head (one channel) from white paper, with the x-axis showing the sample points and the y-axis showing the signal intensity in arbitrary units. FIG. 3b is a graph illustrating the down averaged (and mean subtracted) raw magnetic signals shown in FIG. 3a, but without filtering for system noise. When the magnetic signals of FIG. 3a are down averaged and mean subtracted, the signal intensity averages at approximately zero, as shown in FIG. 3b. FIG. 3c is a graph illustrating the down averaged and mean subtracted raw magnetic signals shown in FIG. 3b, but with the system noise filtering of step 110 applied to the raw signal prior to the down average step 112. Clearly, most of the noises have been eliminated because of the noise filtering of step 110.

Returning to FIG. 2, after the mean subtraction step, the next step is to implement a threshold noise removal step (step 118). A threshold noise removal step involves selecting a threshold $\xi$ so that any value within the range of $[-\xi, \xi]$ is set to zero. This filters out small noise components, particularly in magnetic free areas of a channel. The value of $\xi$ can be determined adaptively according to a small percentage of the maximum amplitude M of the reference signal of a training set, that is $\xi = \beta \cdot M$, where β is a small positive value and normally less than 0.20, for example β can be set to 0.15.

The next step is to check if there are any more banknotes to be measured (step 120). If there are more banknotes in the set of training banknotes, then the flow returns to step 102 and is repeated by inserting another banknote from the training set in the same orientation as the banknote that was just processed.

If there are no more banknotes in the set of training banknotes (that is, if all of the banknotes in the training set have been measured), then the pre-processing flow ends (step 122).

Figure 4:
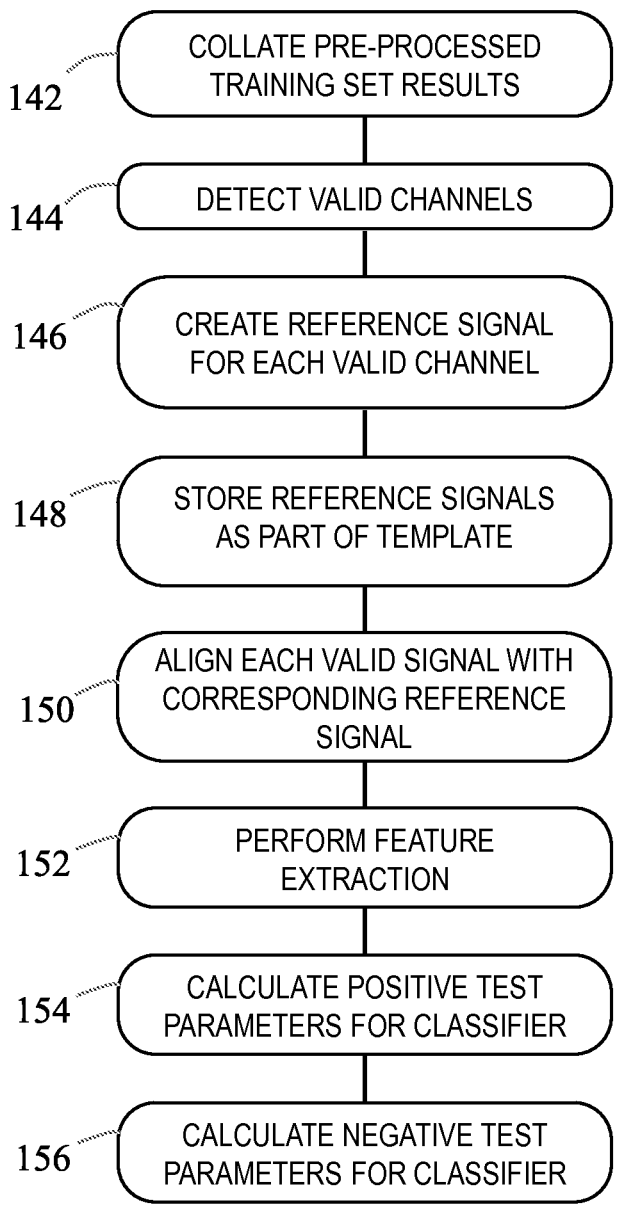
FIG. 4 is a flowchart illustrating a magnetic template generation process performed by the media validator of FIG. 1 using the training set produced by the process illustrated in FIG. 2.

Once the pre-processing flow 100 has ended, the controller 34 then implements a magnetic template generation process 140, as shown in FIG. 4.

Initially, the results of the training set creation process 100 for one orientation of the training set are collated (step 142).

The controller 34 then detects valid signal channels from the training set data (step 144). This is performed because some banknotes contain little or no magnetic information in certain areas of the banknote. For example, only one or two (sometimes none) of the channels may show valid signals for Canadian dollars because Canadian dollars contain very few magnetic features.

Detecting valid channels may be implemented manually (for example, by an operator removing any channel data that does not indicate that any magnetic information is present). However, it is more efficient to implement this automatically.

In this embodiment, automatic detection of magnetic signal data from a read head is performed as follows (sub-steps (i) to (iv) below).

(i) For each banknote 20 in the training set, and for each read head that measured that banknote 20, use the pre-processed data to calculate the signal range $\lambda_k^i$, (that is, the difference between the maximum and minimum values of the magnetic signal for that read head and banknote 20).

(ii) Calculate the average range value $\overline{\lambda}_k$ of the training set for each channel.

(iii) If the average range $\overline{\lambda}_k$ is greater than or equal to $\xi$, where $\xi$ is a small threshold (that is, $\overline{\lambda}_k \geq \xi$), the corresponding channel (read head) is a valid channel (that is, it contains magnetic information).

(iv) If the average range $\overline{\lambda}_k < \xi$, the corresponding channel (read head) is not a valid channel (that is, it contains no magnetic information).

In the above example, the value of $\xi$ is selected as 10.

Once the valid read head signals have been identified, the other read head signals (that is, the signals from those read heads that produced no valid magnetic signals for that denomination type) can be discarded for the purposes of creating a magnetic template, although they will be listed in the magnetic template as having no magnetic signal.

The next step is to create a reference signal from each magnetic read head that generated valid magnetic signals (step 146). In other words, for each of the valid magnetic channels, the controller 34 calculates a reference signal that is the average of the magnetic signals from that magnetic channel for all banknotes in the training set for that orientation. Thus, if there are a hundred banknotes in a training set, and four of the six magnetic read heads produce a magnetic signal (that is, they create valid read head signals for that particular banknote type), then there will be four average signals produced. These reference signals are stored in the template (step 148) for subsequent use during authentication of a banknote (in particular, to align signals recorded from a banknote to be tested, as will be described in more detail below).

The next step is to align the valid signals from the same read head with the corresponding reference signal for that read head (step 150). Thus, if there are a hundred banknotes in the training set, and four of the six magnetic read heads produce a magnetic signal (four valid channels), then there will be four hundred aligned signals, each aligned with the corresponding average signal (that is, the corresponding reference signal).

The next step is to perform feature extraction (step 152) from each of the aligned signals. This step has two sub-processes. The first sub-process relates to spatial features; the second sub-process relates to frequency features.

An entire aligned signal is not particularly useful for classification purposes because it is too complex. For this reason, it is helpful to identify features of the aligned signal (for example, spatial features) and to derive a value for those identified features. This derived value can then be compared with a value derived from corresponding features of a signal from a banknote being authenticated. For example, all non-zero values and their corresponding locations can be used as the spatial features.

Spatial feature extraction (the first sub-process) involves, (i) specifying the similarity measure (spatial domain model) to be used for the valid channels of the banknote 20, and (ii) for each aligned signal for each valid channel, deriving (using the specified similarity measure) the similarity scores between the aligned signal and the reference signal. In other words, if there are four valid channels, and 100 banknotes in the training set, then for the first valid channel there are 100 similarity scores; each similarity score being a measure of the similarity between spatial features in the reference signal for that channel and spatial features in one of the aligned signals. In this example, there would be a total of 400 similarity scores (100 scores per channel, and four valid channels).

The specified similarity measure may be selected from a number of different similarity measures (or models). Any model that is capable of inferring a degree of spatial match between two different one-dimensional signals can be used as the similarity measure. These similarity measures include: (i) a Pearson Product-Moment Correlation Coefficient (PPMCC) model, described, for example, in J. L. Rodgers and W. A. Nicewander, Thirteen ways to look at the correlation coefficient, The American Statistician, 42(1): 59-66, February 1988; (ii) the Intersection Score adapted from the color histogram intersection matching in M. J. Swain and D. H. Ballard, Color Indexing, International Journal of Computer Vision, 7(1): 11-32, 1991; (iii) the Hamming distance described in R. W. Hamming, Error detecting and error correcting codes, Bell System Technical Journal 29 (2): 147-160, 1950; and (iv) City-Block, Canberra, and the other distances summarized and/or implemented in GEDAS: http://gedas.bizhat.com/

In this embodiment, the Intersection Score is used as the specified similarity measure. The normalized Intersection Score h between the reference signal x and the aligned signal y is:

$$h = \frac{\sum_{i=1}^{n} \min(|x_i|, |y_i|)}{\sum_{i=1}^{n} |x_i|}$$

For each banknote in the training set, this score is averaged across all valid channels for that banknote. For example, if there are 100 banknotes in a training set, and four valid channels, one Intersection Score is produced for each banknote. This Intersection Score is an average of the four similarity scores from the four valid channels (one score from each channel) of this banknote. In total, 100 similarity scores will be generated for the 100 banknotes in the training set. These 100 similarity scores will be used to calculate positive test parameters (described in more detail below in step 154).

The type of spatial feature is also specified by the template. In this example, the Intersection Score is the type of spatial feature that is used for all valid channels (however, in other embodiments, different types of spatial feature may be used for different valid channels in the same template).

Frequency feature extraction (the second sub-process) involves, (i) summing the aligned signals for all valid channels to create a summed signal for each banknote, (ii) applying a Fourier Transform (using an FFT algorithm) to the summed signal to produce coefficients corresponding to different frequency components in the summed signal (iii) specifying the frequency components of interest from the summed signal, and (iv) extracting those frequency components from the summed signal.

The frequency components of interest would not typically include high frequencies, because these normally only represent noise. As such, the specified frequency components of interest would typically be the top n frequency components. In this embodiment, n may be in the range of 5 to 50.

At this point, there are frequency components for all banknotes in the training set. These frequency components are "stacked together" as a training feature set. For example, if there are 100 notes in the training set, and 6 frequency components were extracted from each note; the training feature set would be a 100 row by 6 column matrix.

The next step is to calculate the positive test parameters for the classifier (step 154). Parameters will be calculated for both the spatial features and also the frequency features.

In this embodiment, a thresholding test is used to implement a positive test for the spatial features. A number of different thresholding tests could be used. Two suitable thresholding tests are: (i) a crude adaptive threshold, and (ii) a bootstrap threshold.

The crude adaptive threshold involves sorting the spatial feature values (that is, the similarity scores obtained in step 152) of all of the banknotes in the training set in ascending order to produce $\bar{r}_{sorted}$. The threshold $\tau$ can be determined by a predefined significance level $\alpha$ that controls the theoretical false reject rate of the training sample. $\tau = \bar{r}_{sorted}(J)$, where $J = \text{round}(N \cdot \alpha)$; and N is the training size. In this embodiment, a suitable value for $\alpha$ is in the range of 0.001 to 0.01, corresponding to 0.1% to 1% of theoretical false reject rates.

The Bootstrap threshold involves employing the bootstrap technique (described in C. He, M. Girolami and G. Ross. *Employing optimized combinations of one-class classifiers for automated currency validation*. Pattern Recognition, 37: 1085-1096, 2004.) on the training set to estimate the numerical distribution of the test statistic for the null hypothesis that a test sample is from the same class as the training set. More specifically, this involves firstly generating B bootstrap sample sets from the training set, where each bootstrap sample set is formed by repeatedly, nonexclusively and randomly drawing data from the training set so that a bootstrap set would have the same size N as the training set; then randomly selecting an additional (N+1)th testing sample from the training set, and computing the test statistic (that is the similarity score in this embodiment) that the (N+1)th testing sample belongs to each of B bootstrap sample sets; and finally by ordering the B bootstrap replicates of the test statistic in ascending order, the threshold $\tau$ can be determined according to a predefined significance level $\alpha$, in a similar manner to the crude adaptive threshold.

Whichever threshold technique is used (the crude adaptive or the Bootstrap), the calculated threshold $\tau$ is stored in the template for that banknote type.

In this embodiment, a $D^2$ test is used to implement a positive test for the frequency features. The method for training a $D^2$ test for frequency features is described in U.S. Pat. No. 7,639,858, which is incorporated herein by reference, and also in "Multivariate Statistical Methods" (third edition), by Morrison, McGraw-Hill Publishing Company, New York (1990). The template stores the parameters for the $D^2$ test that are obtained during training.

Either (or both) of these classifiers (the thresholding test for spatial features or the $D^2$ test for frequency features) can be used as a positive test for banknote authentication. Preliminary results indicate that the thresholding test for spatial features works well for any currencies; whereas, the $D^2$ test works particularly well for currencies that have a significant number of magnetic features.

Figure 5:
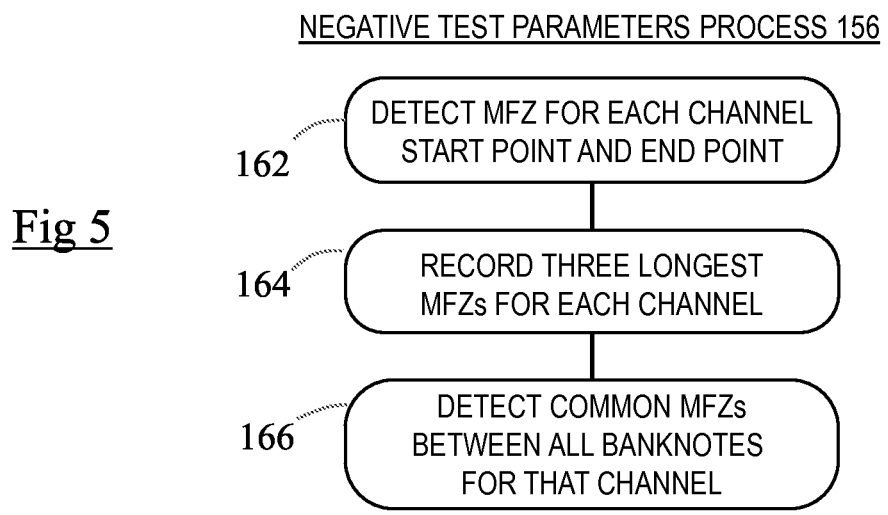
FIG. 5 is a flowchart illustrating part of the magnetic template generation process of FIG. 4, showing the calculation of negative test parameters in more detail.

The next step is to calculate the negative test parameters for the classifier (step 156), which is illustrated in FIG. 5.

The first sub-step (step 162) is to detect the magnetic free zones (MFZ) for each channel (not just the valid channels) and record their starting and ending coordinates [idx_$s_i$, idx_$e_i$]. This is done for each banknote in the training set.

A magnetic free zone (MFZ) is defined as a continuous section of the signal where no significant magnetic response is present; that is, where all the signal points have a value of zero (in the signals after step 118) or within a small pre-defined range. A candidate MFZ qualifies only if its length is longer than certain pre-defined threshold (for example, 20% of the banknote length).

The second sub-step (step 164) is to record the three longest MFZs for each channel. Since only qualified MFZs are recorded, sometimes there may be less than three or even none of MFZs for certain banknote types due to their magnetic printing design. The reason that only the three longest MFZs are selected is to minimize the storage and computational cost. For channels that were deemed not to have any valid magnetic signals (in step 144 above), the whole channel length is deemed to be an MFZ.

The third sub-step (step 166) is to detect, for each channel, the common MFZs for that channel across all of the banknotes in the training set. Although all banknotes in the training set are of the same denomination and series, nevertheless, circulated banknotes vary by size (length and width) and condition. Thus, the starting and ending coordinates of the candidate MFZs detected for each channel may vary from one banknote in the training set to the next. However, there should be a significant overlap. Detecting the common MFZs is implemented using clustering technique (for example, any versions of K-Means, described in A. Likas, N. Vlassis and J. J. Verbeek. *The global k-means clustering algorithm*. Pattern Recognition, 36: 451-461, 2003) can be applied to identify the common MFZs.

Figure 6:
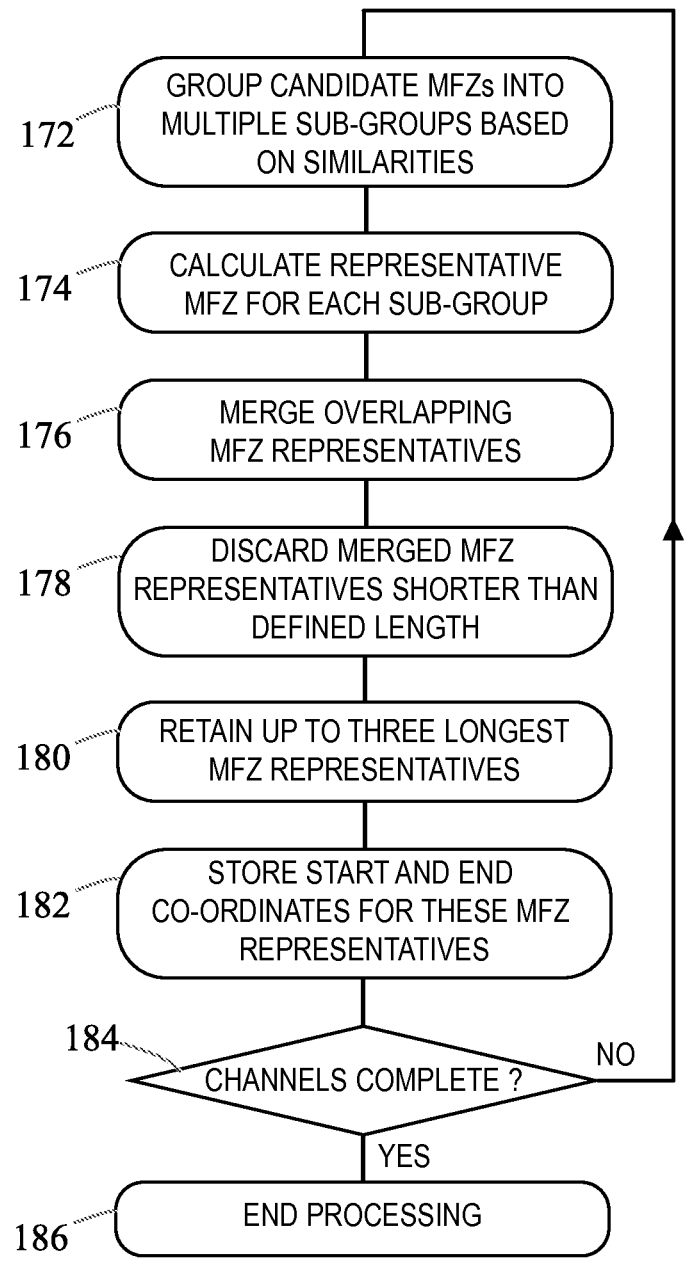
FIG. 6 is a flowchart illustrating part of the calculation of negative test parameters of FIG. 5, showing detection of common magnetic free zones for the training set.

This third sub-step includes the following sub-steps, illustrated in FIG. 6.

The first sub-step is to use clustering techniques to group all candidate MFZs into multiple sub-groups according to their similarities (distances) (step 172).

For each sub-group, calculate and use the intersection (that is, the overlap) of all member MFZs as a representative MFZ for this sub-group (step 174).

Merge the overlapped MFZ representatives (step 176).

Discard any MFZ representatives that are shorter than a pre-defined threshold, (for example, 20% of the banknote length) (step 178).

Select the longest three MFZ representatives and discard any other MFZ representatives (step 180).

The longest three MFZ representatives are deemed to be the common MFZs of all the banknotes in the training set for that channel, and their starting and ending coordinates are stored in the template for that channel, together with a false ratio threshold for use with the MFZs (step 182). The false ratio threshold represents the acceptable level of non-zero magnetic points in a MFZ, and is normally greater than 0 and less than 0.15. Setting the false ratio threshold too high may increase the counterfeit accepting risks; while setting this value too low may lead to high false rejection of genuine notes.

These steps (of flowchart 166) are repeated until each of the channels in the template is populated with up to three MFZs (step 184), and then the processing ends (step 186).

At the end of the process (step 186), a template has been created that includes: a reference signal for each valid channel; a list of the valid channels; a calculated threshold (derived from the similarity score) for the spatial feature of each valid channel; optionally frequency components, a standard length Ln for that banknote, a spatial feature type for the valid channels, or for each valid channel if a different spatial feature is used for each channel, the parameters for the $D^2$ test (only if the frequency components are used) that were obtained during training, up to three MFZs for each channel (valid and invalid) including start and end points of each MFZ, and a false ratio threshold for use with the MFZs.

Figure 7A:
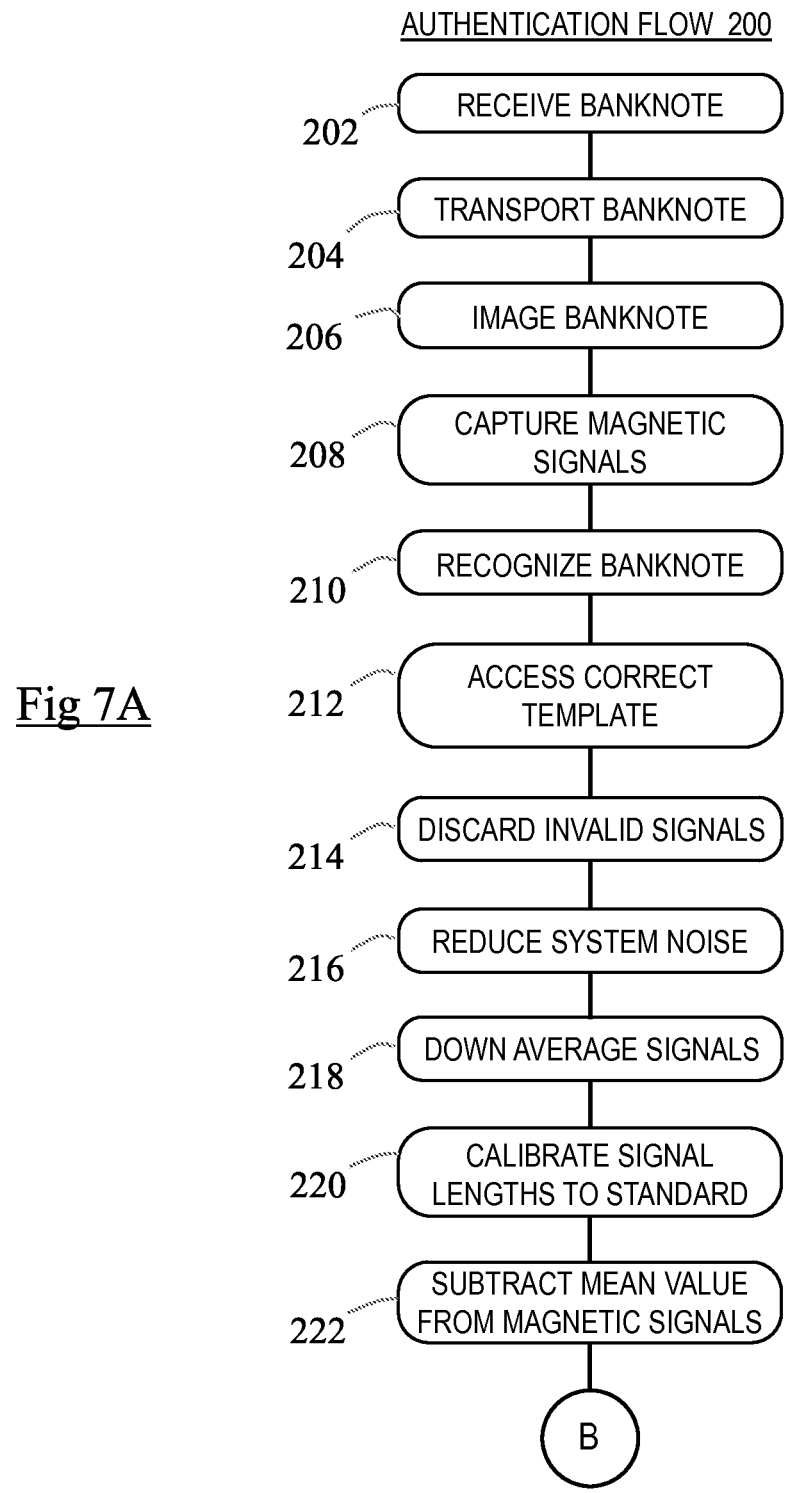
FIG. 7 is a flowchart (split over two sheets as FIGS. 7A and 7B) illustrating authentication of a banknote using the magnetic template generated by the process of FIG. 4.

Authentication of a banknote using magnetic information from the banknote will now be described with reference to FIG. 7, which is a flowchart 200 illustrating steps performed by the banknote validator 12. It should be appreciated that this process 200 relates only to the magnetic authentication process. Banknote validators may perform a number of other processes including recognition (to identify the banknote currency, denomination and orientation) optical authentication, fitness assessment, and the like. A final decision on authentication may be based on a number of different factors, such as magnetic authentication, optical authentication, and the like.

The first four steps of the magnetic authentication process 200 are identical (or at least very similar) to the first four steps of the training set creation process 100.

Initially, a banknote to be authenticated (the "test banknote") is inserted into the validator 12, which the banknote validator 12 receives (step 202). The test banknote may be inserted in any orientation.

The controller 34 then transports the test banknote to the examination area 22 (step 204) and causes the CIS sensor 28 to capture an image of the test banknote (step 206) and the magnetic sensor array 30 to capture analogue signals (one from each magnetic read head) from the test banknote (step 208).

Banknote recognition (step 210) is then performed to identify the currency, denomination, and orientation of the test banknote. This is implemented using the image of the test banknote captured in step 206.

Once the banknote type has been identified, the template for that banknote type is accessed and information about the valid magnetic channels is retrieved (step 212).

Those magnetic signals corresponding to channels that do not produce valid magnetic signals (that is, invalid channels) are discarded (step 214).

The controller 34 operates on the remaining analogue signals from the magnetic sensor array 30 (that is, on the valid channels) to reduce noise introduced by the media validator 12 (step 216). This is implemented using the same technique, and the same parameters, as described in step 110 for the training set process 100 (that is, Fourier spectral analysis is used over the valid frequency range [Fs_start, Fs_end]).

The next step is to down average the noise-reduced signals (step 218) in the same way and using the same parameters as described in step 112 for the training set process 100 (that is, by averaging every θ sample points from a channel (in this embodiment θ was selected as "11") for each of the six read heads in the magnetic sensor array 30).

The next step is to calibrate (crop) the signal length from all of the valid read heads in the magnetic sensor array 30 to the standard length Ln (step 220) in the same way as described in step 114 for the training set process 100. The standard length Ln for that banknote is retrieved from the template and used in this calibration step.

The mean value for each magnetic signal is then subtracted from each valid magnetic signal (step 222) in the same way as described in step 116 for the training set process 100.

A threshold noise removal step (step 224) is then performed. Again, the same technique is used in this step 220 as was used in the threshold noise removal step (step 118) of the training set process 100. The values [−ξ, ξ] used may be the same as those used in the training set, or may be determined adaptively by using a small percentage of the maximum amplitude M of the measured signal.

A signal alignment process (step 226) is then performed. This involves, for each valid channel, retrieving from the template a reference signal for that valid channel, and minimizing the RMS error. This is implemented by shifting the calibrated length signal along the sampling position axis. For each shift (that is, for each shift by one sampling position), the RMS value between the shifted signal and the reference signal is calculated. After evaluating all possible shifts within a defined the range (for example, from minus ten sampling positions to plus ten sampling positions), the shift with the minimal RMS value is selected; and the corresponding shifted signal is regarded as the aligned signal for that channel.

A frequency feature extraction process is performed (step 228). Although frequency feature extraction is described at this point, it could be performed at any time after the magnetic signals have been captured (step 208) because the frequency components are not affected by shifting and alignment.

When performed at this point, frequency feature extraction involves: (i) summing the aligned signals for all valid channels to create a summed signal for the test banknote, (ii) applying a Fourier Transform (as described with reference to step 152 in the template generation process 140) to the summed signal to produce coefficients corresponding to different frequency components in the summed signal, (iii) accessing the template to ascertain the frequency components of interest, and (iv) extracting those frequency components of interest from the summed signal.

Once the signal alignment process (step 226) has been performed, a spatial feature extraction process can be implemented (step 230).

Spatial feature extraction involves, (i) retrieving a spatial feature type from the template (in this embodiment it is the Intersection Score), and (ii) for each aligned signal for each valid channel, deriving (using the Intersection Score) the similarity scores between the aligned signal and the reference signal. The Intersection Score is derived in the same was as described with reference to step 152 of the template generation process 140.

The next step is to perform a positive authentication test (step 232). This test is to ensure that a magnetic signal has magnetic information in the correct locations. There are two parts to this test: a spatial part and a frequency part. Either part may be used on its own, or both parts may be used, as desired.

The first part (the spatial part) of the positive authentication test involves retrieving from the template the calculated threshold for the spatial feature of each valid channel. A thresholding test is then performed. This may be performed by averaging all of the similarity scores and comparing them with the average of the retrieved thresholds. However, in this embodiment, the individual retrieved similarity scores are used. This is implemented by comparing the similarity score of each selected channel to the corresponding threshold for that channel (retrieved from the template). The results for each of the individual channels are then combined together to provide the final decision. In this embodiment, majority voting is used. The test banknote will pass the (or this part of the) positive authentication test if the majority of the channels have a feature value greater than or equal to the threshold; otherwise the test banknote will fail the positive authentication test.

The second part (the frequency part) of the positive authentication test involves using a $D^2$ frequency test, as described in U.S. Pat. No. 7,639,858 assigned to NCR Corporation. The test banknote is deemed counterfeit if it fails this test.

The next step is to perform a negative authentication test (step 234).

The negative test begins by accessing the template to retrieve, for each valid channel, the longest three MFZ representatives, including their starting and ending coordinates.

For each channel, and for each MFZ in each channel, the banknote validator 12 calculates a ratio of non-zero points to all points along the length of the magnetic-free zone (for example, if there are 50 points in the first MFZ for a channel, and 20 of these points are non-zero points, then the ratio is 0.40).

The banknote validator 12 then calculates an overall average of the ratios for all magnetic-free zones (in all channels). This is referred to as the overall false ratio. If the overall false ratio is less than or equal to a ratio threshold (retrieved from the template), then the test banknote passes this negative test; otherwise the test banknote fails this negative test.

The next step is to combine the positive and negative authentication tests to classify the test banknote as either genuine or counterfeit (step 236).

The results may be combined by using a unanimous vote so that the test banknote is only passed as genuine if the test banknote passes both the positive test and the negative test. However, in this embodiment, the results are combined by using weighting factors to reflect the characteristics of individual banknotes. The combined results are based on a normalized positive result score multiplied by a weighting factor ($\alpha$) plus a normalized negative result score multiplied by one minus $\alpha$ (where $\alpha$ is between zero and one). For media items that do not have many (or any) designated magnetic features, the weighting factor ($\alpha$) may be low such that a positive test is not given much significance.

It should be appreciated that the positive authentication test and the negative authentication test may be combined with other authentication tests, for example, optical authentications tests, so that the test banknote is authenticated based on a combination of different tests (both magnetic and non-magnetic).

It should also be appreciated that the above embodiment has a number of advantages. For example, the training process can be done automatically. No counterfeit data is required for training (that is, for template generation). The process is adaptive, so it can be applied to any currencies (or non-banknote media). The process is fast and does not require intensive computation.

Various modifications may be made to the above described embodiment within the scope of the invention, for example, in other embodiments, the transport mechanism 15 may comprise a different arrangement, for example, one or more of skid plates, endless belts, gear trains, and the like.

It should be appreciated that the media items may be items other than banknotes, such as tickets, coupons, passports, or the like.

It should be appreciated that some of the steps described above could be carried out in a different order to the order described. The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method of authenticating a media item, the method comprising:
   measuring a magnetic signal along the media item,
   converting the measured signal to a calibrated length signal,
   aligning the calibrated length signal with a reference signal, including shifting the calibrated length signal, determining that a measure of difference between the shifted calibrated length signal and the reference signal is at a minimum, and selecting the shifted calibrated length signal as an aligned signal,
   extracting features from the aligned signal, and
   classifying the media item based on the extracted features.

2. A method according to claim 1, wherein the step of measuring a magnetic signal along the media item comprises measuring a plurality of magnetic signals along the media item.

3. A method according to claim 1 or 2, wherein the method comprises the further step, after measuring the signal, of removing system noise from the measured signal.

4. A method according to claim 1, wherein the method comprises the further step, after measuring the signal, of averaging a plurality of sampled points to create one averaged sample point.

5. A method according to claim 1, wherein converting the measured signal to a calibrated length signal comprises ascertaining a centre point of the measured signal length and cropping the measured signal length to half of the desired length in opposite directions from the centre point.

6. A method according to claim 1, wherein the method comprises the further step of normalizing the magnetic signal.

7. A method according to claim 1, wherein the step of extracting features from the aligned signal comprises the further steps of (i) extracting features from a spatial domain, and (ii) extracting features from a frequency domain.

8. A method according to claim 1, wherein the step of classifying the media item based on the extracted features comprises a positive test and a negative test.

9. A method according to claim 8, wherein the positive test comprises validating that the aligned signal from the media item has a magnetic response at the spatial locations corresponding to magnetic ink printed features of a genuine media item.

10. A method according to claim 8, wherein the negative test comprises validating that the aligned signal from the media item has no magnetic response at the spatial locations that are not printed by magnetic inks in a genuine media item.

11. A method according to claim 10, wherein the negative test comprises the further steps of (i) ascertaining start and end coordinates of each area of the media item that should not have a magnetic response by accessing data stored in a reference, (ii) calculating, for each magnetic-free zone, a ratio of non-zero points to all points along the length of the magnetic-free zone, and (iii) calculating an overall average of the ratios for all magnetic-free zones, and (iv) comparing the overall average to a threshold specified by a reference.

12. A method according to claim 8, wherein the step of classifying the media item based on the extracted features further comprises combining the results of the positive test and the negative test.

13. A method according to claim 1, wherein the step of classifying the media item based on the extracted features includes classifying the media item based on a combination of image-based processing and the extracted features relating to the magnetic response.

14. A self-service terminal comprising a magnetic reader for measuring magnetic signals from a media item, and a controller operable to: (i) convert the measured signal to a calibrated length signal, (ii) align the calibrated length signal with a reference, including shift the calibrated length signal, determine that a measure of difference between the shifted calibrated length signal and the reference is at a minimum, and select the shifted calibrated length signal as an aligned signal, (iii) extract features from the aligned signal, and (iv) classify the media item based on the extracted features.

15. A method of authenticating a media item using magnetic information, the method comprising:
    measuring a magnetic signal along the media item,
    extracting features from the magnetic signal, and
    classifying the media item based on the extracted features by using a positive test and a negative test,
    wherein the positive test includes validating that the magnetic signal has a magnetic response at spatial locations corresponding to magnetic ink printed features of a genuine media item, and
    wherein the negative test includes validating that the magnetic signal has no magnetic response at spatial locations that are not printed by magnetic inks in the genuine media item.

16. A method according to claim 15, wherein the negative test is based on a magnetic free zone.

* * * * *